May 20, 1930. D. GREGG 1,759,006
AUTOMATIC VALVE
Filed April 11, 1923 2 Sheets-Sheet 1

INVENTOR
DAVID GREGG.
BY Robert A. Jones
ATTORNEY

May 20, 1930.  D. GREGG  1,759,006

AUTOMATIC VALVE

Filed April 11, 1923    2 Sheets-Sheet 2

INVENTOR
DAVID GREGG,
BY
ATTORNEY

Patented May 20, 1930

1,759,006

UNITED STATES PATENT OFFICE

DAVID GREGG, OF DAYTON, OHIO

AUTOMATIC VALVE

Application filed April 11, 1923. Serial No. 631,334.

This invention relates to valves and more particularly to a pressure controlled drain valve.

It is an object of this invention to provide a valve responsive to variations in temperature or pressure under normal or abnormal conditions of the atmosphere.

It is a further object of the invention to provide a valve responsive of variations of temperature or of pressure that may be constructed simply and economically. The valve may be so constructed that it will vary directly or indirectly with the pressure or temperature or may vary with any atmospheric characteristics that in turn varies with altitude or the season of the year.

A further object of this invention is to provide a valve of the type above specified, which may be adaptable for use as an automatic drain valve for any fluid or condensing line wherein the pressure within is not equal to that outside said line.

It is a further object to provide a valve of the character specified that will automatically drain the carburetor or fuel line, as may be desired in any supercharged airplane engine.

Other objects will become apparent from the description and claims and from the drawing in which:

Figure 1:
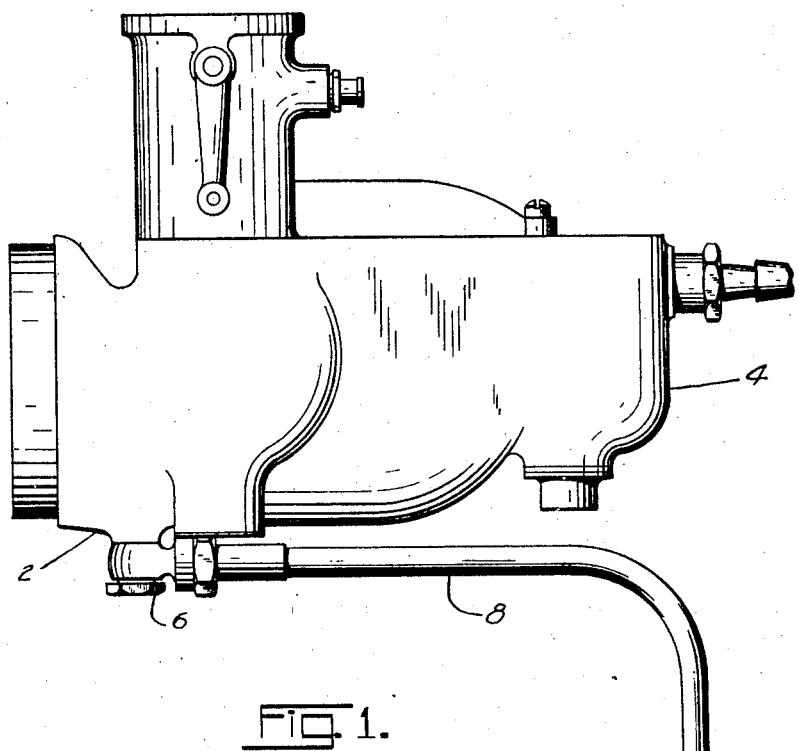
Fig. 1 is a view showing the invention applied to an airplane carburetor to act as an automatic drain therefor.
Figure 2:
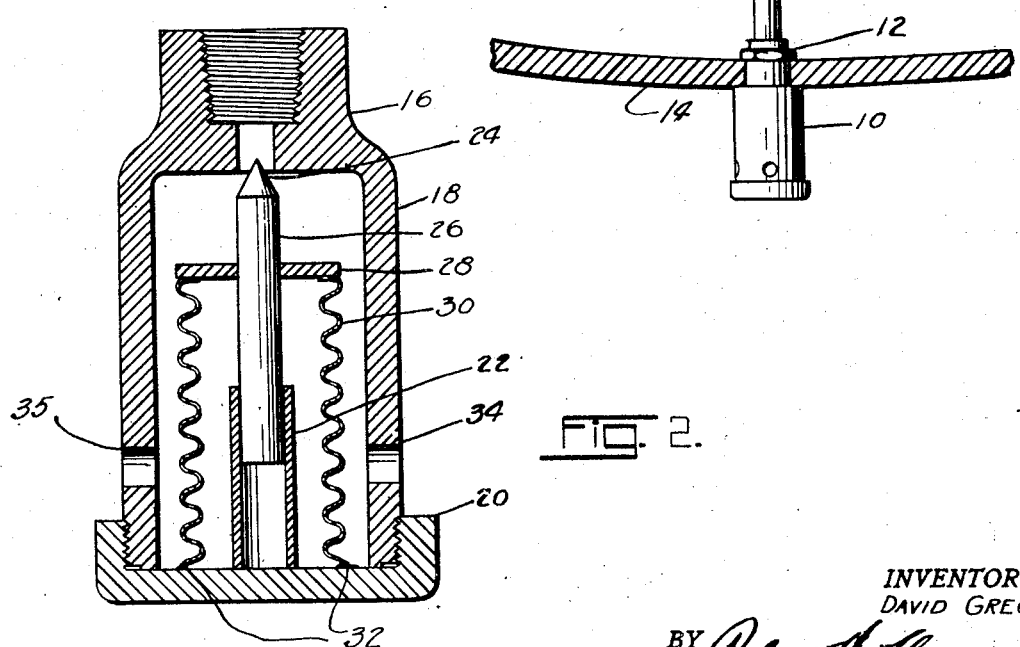
Fig. 2 is a vertical section of the automatic valve showing its construction.
Figure 3:
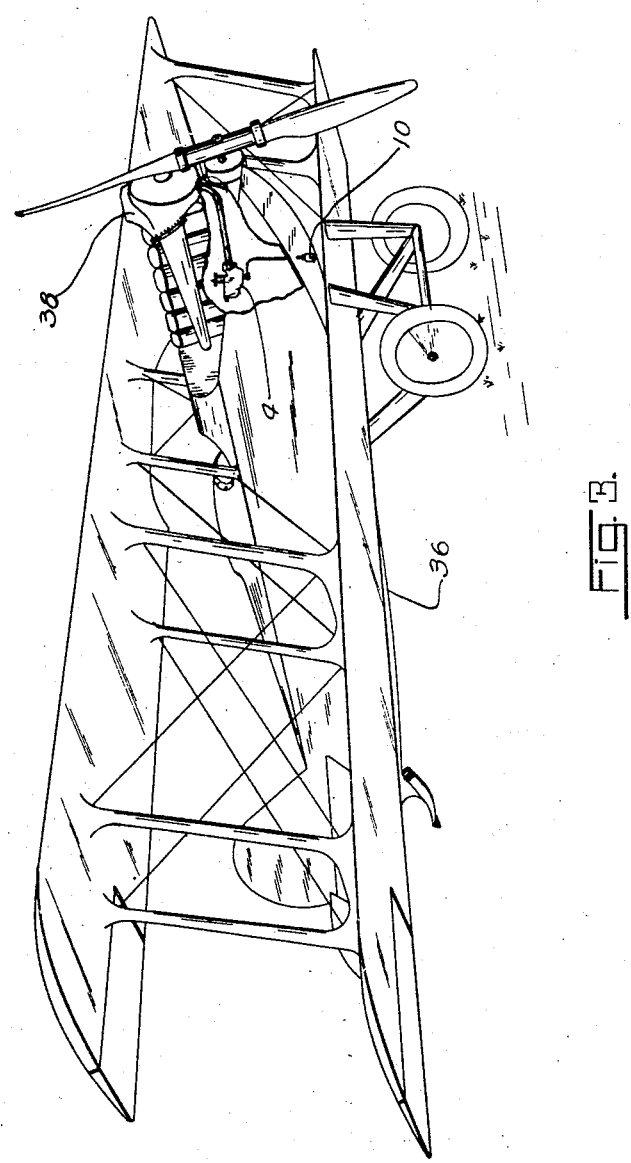
Fig. 3 is a perspective view of an airplane equipped with a supercharger and showing the approximate location of the drain valve.

Referring to the drawing, to the base 2 of carburetor 4 is attached in any suitable manner, as by connection 6, a drain line 8 leading to a valve 10 through a valve connection 12, passing through the bottom portion 14 of the airplane structure. Heretofore in order to lessen the danger from fire, in case of back fire of the engine, through the carburetor, it has been necessary to provide a drain valve connected to the bottom sump of the carburetor, to drain out any residue of fuel which may have accumulated therein. On supercharged airplanes this drain valve is left open while the airplane is on the ground, but before the airplane leaves the ground, it must be shut off, or the air in the carburetor intake manifolds, being constantly maintained at atmospheric pressure or thereabouts by the supercharger, would blow out and waste through this drain line. In order to guard against the possible inadvertent leaving open of this valve, automatic means which will close the valve at a proper altitude are necessitated. A housing generally designated 16, composed of a separate coupling and valve seat portion 18, and a bottom cap portion 20, contains the automatic valve mechanism. To the cap portion 20 is secured by appropriate means, a needle valve stem guide 22, whose axis is in alignment with the axis of valve seat 24, and which guide carries needle valve 26 slidably therein. To the needle valve is attached a member 28, to which is hermetically connected a diaphragm or bellows 30, which is in turn hermetically connected to cap portion 20 at 32. The housing 18 is provided with apertures 34 through which excess fuel may drain. In operation, the valve may be arranged to be open to drain the carburetor or fuel line while the airplane or aircraft to which it is attached remains on the ground, but automatically close after the airplane has ascended 2,000 or 3,000 feet, and automatically open again when the airplane descends below such an altitude. In the view of Fig. 3 of the drawing, I have shown an airplane 36 equipped with a supercharger 38, illustrating the approximate relative location of the carburetor 4 and drain valve 10.

What I claim and desire to secure by this patent is:

1. A fuel system for an aircraft engine, fuel atomizing means in the fuselage of the aircraft, means exterior of the fuselage and in connection with the atomizing means responsive to variations in atmospheric pressure for draining the fuel atomizing means.

2. In a fuel supply system for an aircraft engine, including a supercharger, a carburetor, a drain valve for said system comprising a valve housing having inlet and outlet openings, a valve stem adapted for movement in said housing to close said inlet opening and means responsive to atmospheric pressure variations for moving said valve stem to open and close said inlet opening.

In testimony whereof I affix my signature.

DAVID GREGG.